United States Patent
Shih

(10) Patent No.: US 6,649,865 B1
(45) Date of Patent: Nov. 18, 2003

(54) CONTROL METHOD FOR OPTICAL LENS-SEAT ON A LASER PROCESSING MACHINE

(75) Inventor: Leonard Shih, Taipei Hsien (TW)

(73) Assignee: Great Computer Corp., Taipei Hsien (TW)

( * ) Notice: Subject to any disclaimer, the term of this patent is extended or adjusted under 35 U.S.C. 154(b) by 0 days.

(21) Appl. No.: 10/212,781

(22) Filed: Aug. 7, 2002

(51) Int. Cl.⁷ .............................................. B23K 26/06
(52) U.S. Cl. ............................ 219/121.75; 219/121.85
(58) Field of Search ...................... 219/121.75, 121.73, 219/121.85, 121.6

(56) References Cited

U.S. PATENT DOCUMENTS 5,670,067 A * 9/1997 Koide et al. ............ 219/121.68
6,239,924 B1 * 5/2001 Watson et al. .............. 359/819

FOREIGN PATENT DOCUMENTS

TW          482710 A   *   4/2002   ........... B25B/11/00

* cited by examiner

Primary Examiner—M. Alexandra Elve
(74) Attorney, Agent, or Firm—Troxell Law Office PLLC

(57) ABSTRACT

A method for controlling a seat of an optical lens on a laser processing machine comprising the following steps: a. the optical laser lens-seat divides the working zone into three parts when it is moved over the working piece; b. the optical laser lens-seat is accelerated when it stays at the first part, is in a constant speed when it stays at the second part, and is decelerated when it stays at the third part; c. the optical laser lens-seat keeps its normal output power when it is at the part with said constant-speed, its output power is relatively increased when it is at the part being accelerated, and its output power is relatively reduced when it is at the part being decelerated; d. the amount of laser irradiation in each displacement unit thus is equal, both sides of the working piece do not need to leave inactive sides, hence working time is reduced.

2 Claims, 6 Drawing Sheets

Prior Art Fig. 1

CONTROL METHOD FOR OPTICAL LENS-SEAT ON A LASER PROCESSING MACHINE

BACKGROUND OF THE INVENTION

1. Field of the Invention

The present invention is related to a method for controlling a seat of an optical lens on a laser processing machine, and especially to a method applicable to various laser carving machines, laser cutting machines etc.

2. Description of the Prior Art

In a conventional laser processing machine, when an optical laser lens-seat "A" is reciprocatively moved on a slide rail "B", the stroke of one way of moving includes an accelerating, a constant-speed and a decelerating process. Referring to FIG. 1, by virtue that in the constant-speed zone "F", the speed of the laser optical lens-seat "A" is most stable and suitable, and the output of a conventional laser element is controlled to be constant to prevent occurring of uneven speeds on the right and the left sides of a working zone "C" where a working piece "D" is placed in, which uneven speeds may result uneven irradiating amount of laser at each displacement unit. Thereby, the working zone "C" is set only in the constant-speed zone "F", an accelerating zone "E" at the left side and a decelerating zone "G" at the right side of the working zone "C" can not afford working and form inactive sides. Therefore, when a working piece "D" is larger, practically, the area of the constant-speed zone "F" shall be increased, and the entire working zone "C" shall relatively be increased to receive the working piece "D" in the constant-speed zone "F" without affecting the working piece "D". However, no matter how it is changed, the working zone "C" is available only in the constant-speed zone "F"; the accelerating zone "E" and the decelerating zone "G" are not available and thereby are wasteful and not desired.

And as shown in FIG. 2, when in working of the laser optical lens-seat "A", a fixed stroke such as of 4 cm length is necessary for accelerating from the starting to the constant speed, while if the working area is very small, say 2 cm, in a working process of a conventional structure, 8 cm will be left for the two sides including the accelerating zone "E" and the decelerating zone "G" and this is far larger than the length 2 cm of the middle constant-speed zone "F", and the laser optical lens-seat "A" must move reciprocatively within a larger scope 10 cm for processing on the 2 cm small working piece to result nonsense virtual works. And this is also a defect of the conventional methods.

In view of the above defects resided in the conventional methods, the inventor of the present invention thought a way to improve and provided a method for controlling an optical lens-seat on a laser processing machine to increase the speed of working and reduce the time of working.

SUMMARY OF THE INVENTION

The primary object of the present invention is to provide a method for controlling an optical lens-seat on a laser processing machine to increase the speed of working and reduce the time of working.

To achieve the object, in the method for controlling an optical laser lens-seat on a laser processing machine of the present invention, the optical laser lens-seat divides the working zone into three parts when it is moved over the working piece, the optical laser lens-seat can stay at the first part to be accelerated, at the second part in a constant speed, and at the third part to be decelerated. Thereby, the optical laser lens-seat can maintain a normal output power when it is in the constant-speed zone, the output power will be relatively increased when it is in the accelerating zone, and the output power will be relatively reduced when it is in the decelerating zone. Thereby, the amount of laser irradiation in each displacement unit can be equal, hence the distance of moving required in working can be reduced; this can increase the speed of working and reduce the time of working.

The present invention will be apparent in its novelty and features after reading the detailed description of the preferred embodiment thereof in reference to the accompanying drawings.

DETAILED DESCRIPTION OF THE PREFERRED EMBODIMENT

Figure 1:
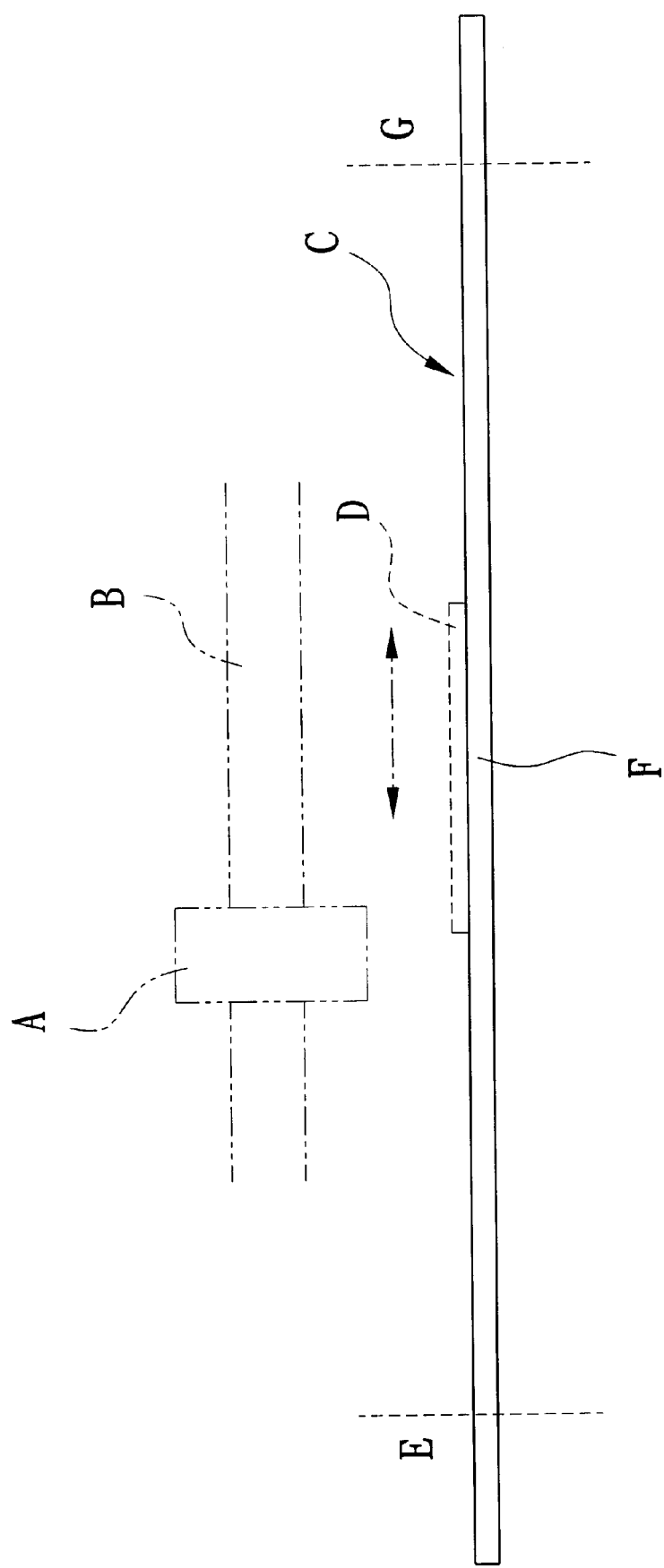
FIG. 1 is a schematic view showing a working zone on a conventional laser processing machine.
Figure 2:
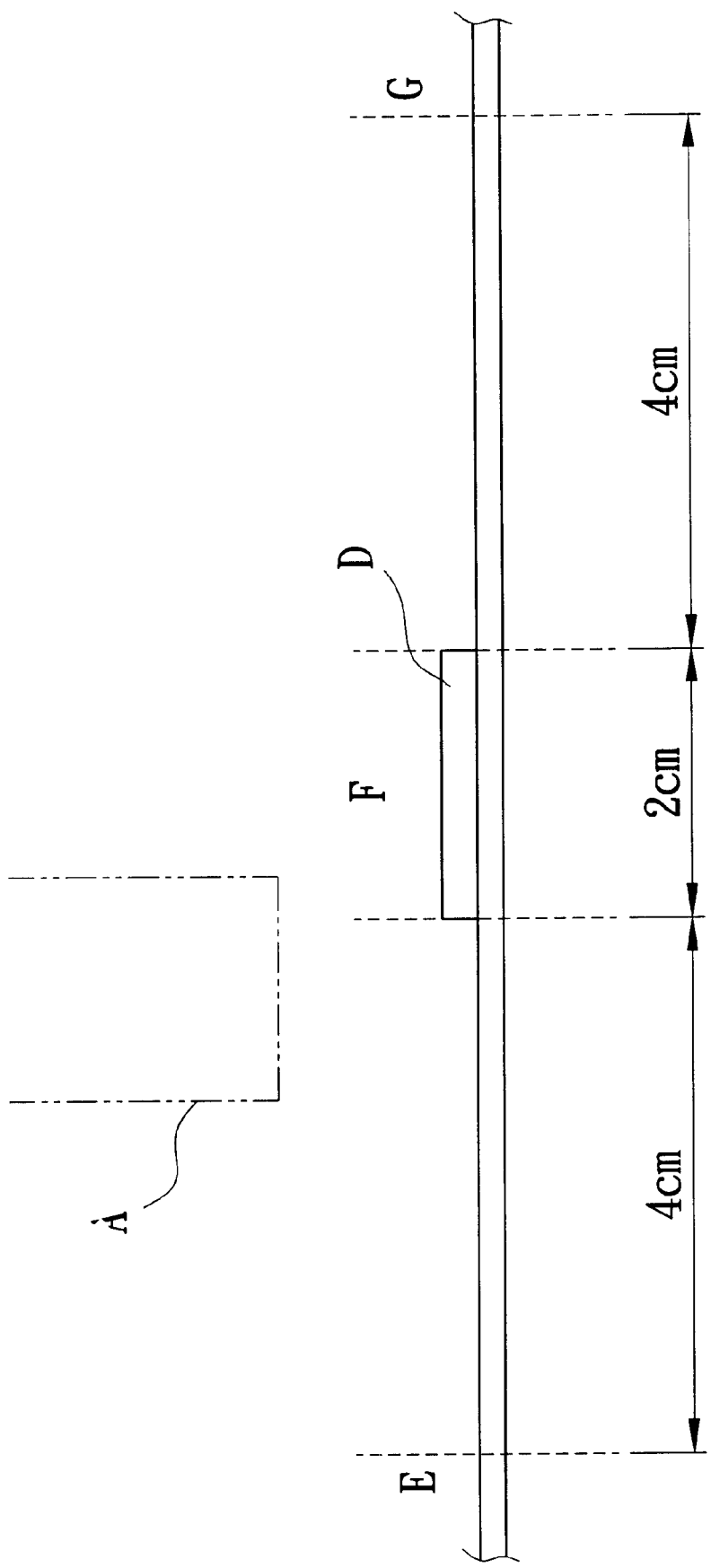
FIG. 2 is a schematic view showing the method of processing of the conventional structure on a small working piece.

Referring firstly to FIGS. 1, 2 showing the method of processing on a conventional laser processing machine, which method has been narrated hereinbefore, and no further description is necessary here.

Figure 3:
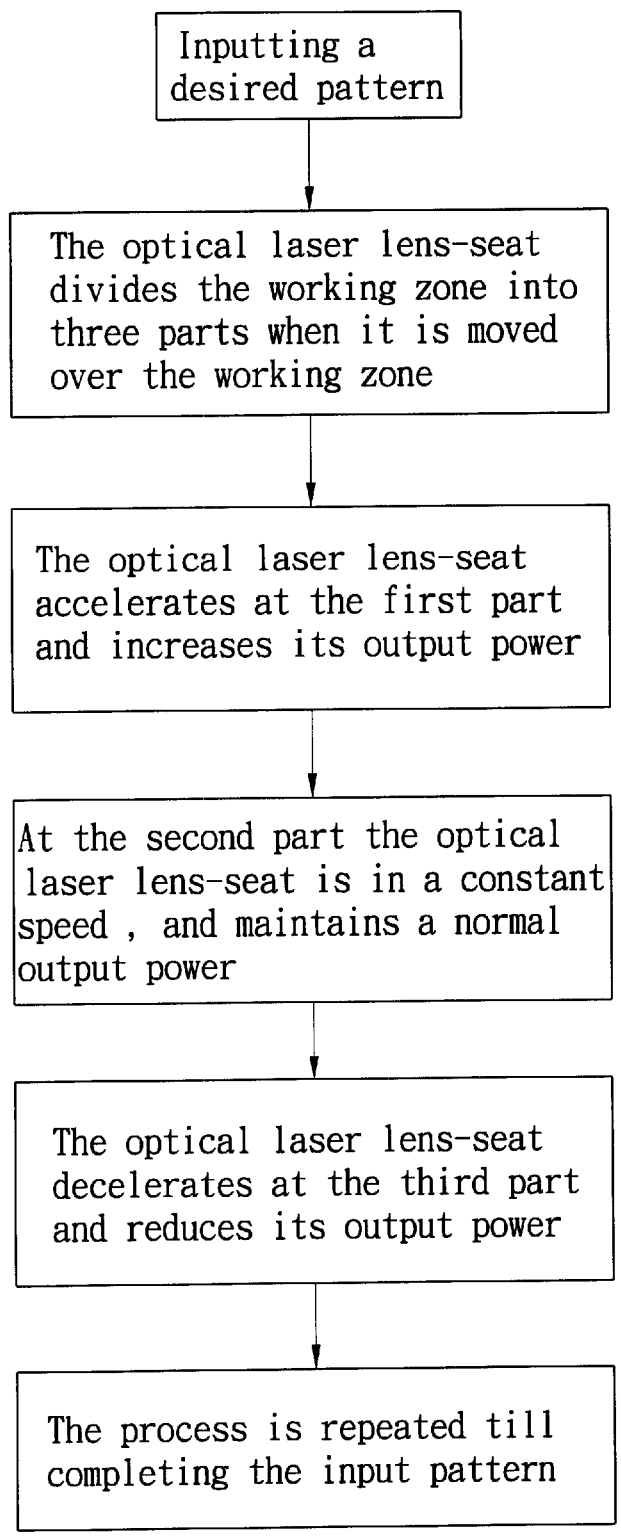
FIG. 3 shows a block diagram of a process chart of the present invention.
Figure 4:
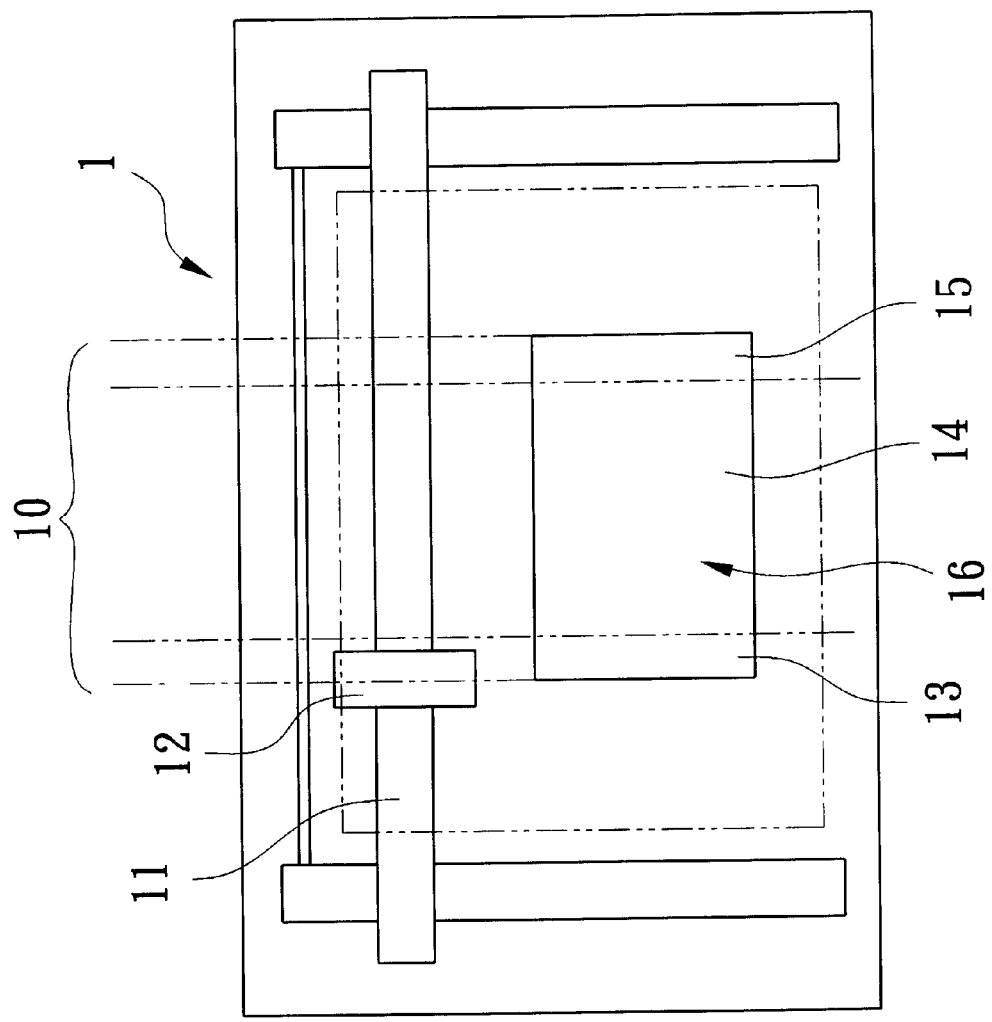
FIG. 4 is a schematic view showing use of the present invention.

Referring to FIGS. 3, 4 showing the method of controlling of an optical laser lens-seat 12 of the present invention, in the first place, a working piece 16 is placed on a surface of a laser processing machine 1, a desired pattern is input into the laser processing machine 1; the optical laser lens-seat 12 divides the working zone 10 into three parts when it is moved by a rail rod 11 over the working piece 16, for convenience of explanation, the three parts are named a starting zone 13, a middle zone 14 and an end zone 15. When the optical laser lens-seat 12 is placed in the starting zone 13, it will accelerate and increase its output power; when the optical laser lens-seat 12 enters the middle zone 14, it will have a constant speed and a normal output power; and when the optical laser lens-seat 12 enters the end zone 15, it will decelerate and decrease its output power relatively. This process is repeatedly performed until the process of carving the pattern is completed. Thereby, the amount of laser irradiation in each displacement unit can be equal, both sides of the working piece 16 do not need to leave inactive sides, hence the speed of working can be increased and the time of working can be reduced.

Figure 5:
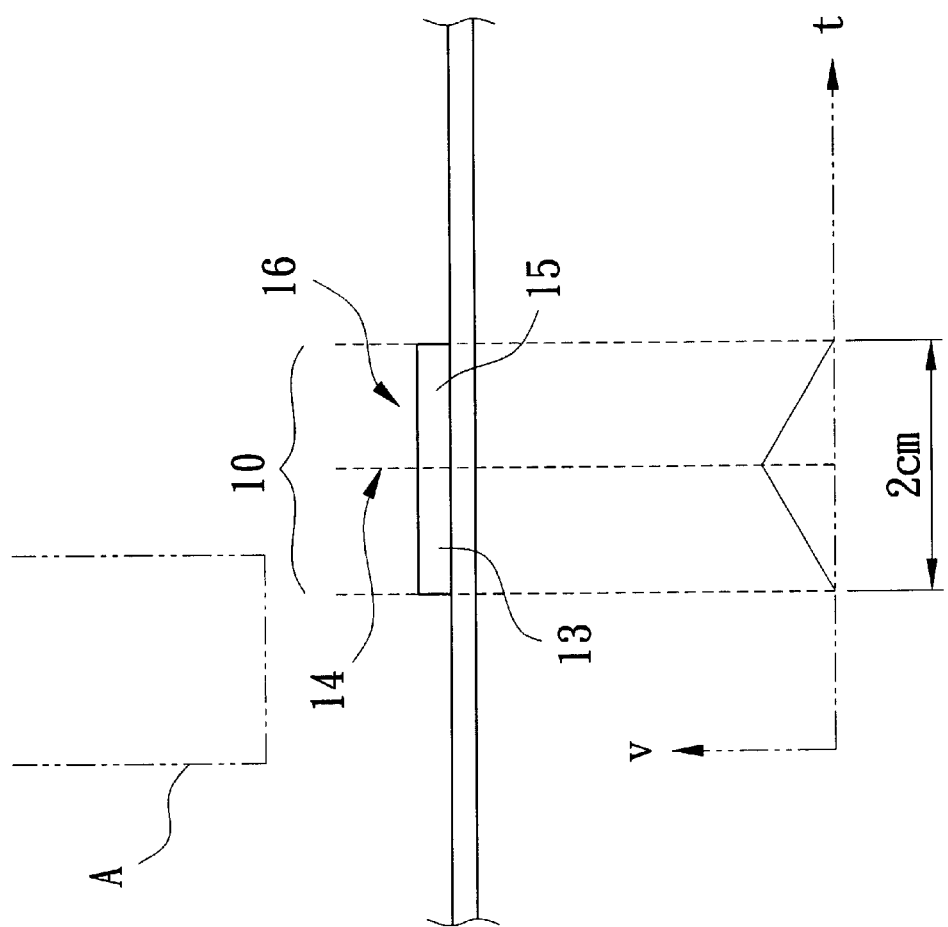
FIG. 5 is a schematic view showing the method of processing of the present invention on a small working piece.

As shown in FIG. 5, during working of the optical laser lens-seat 12, a fixed stroke is necessary for accelerating from the starting to the state having a constant speed; for example, the area of the working piece 16 is as small as 2 cm, in processing of the optical laser lens-seat 12, it is probable that the middle zone 14 of constant speed is not required in use; after the optical laser lens-seat 12 enters the starting zone 13, it is accelerated promptly and is to enter the end zone 15 immediately for decelerating without the requirement of passing the middle zone 14 of constant speed. Therefore, when the working piece 16 is smaller, the optical laser lens-seat 12 can calculate automatically in pursuance of the area of the working piece 16 to similarly divide the working zone 10 into three parts, but the original middle zone 14 of constant speed is changed as a starting line in a virtual way for decelerating; so that after the optical laser lens-seat 12 enters the starting zone 13 and accelerates and when it reaches the virtual starting line for decelerating of the original middle zone 14 (before getting the constant speed), it enters the end zone 15 directly for decelerating. The optical laser lens-seat 12 thereby reciprocates rightwards and leftwards for switching between accelerating and decelerating in the small area of 2 cm equal to that of the working piece 16, the optical laser lens-seat 12 thereby fast processes on the small working piece 16 to effectively reduce the time of working.

Figure 6:
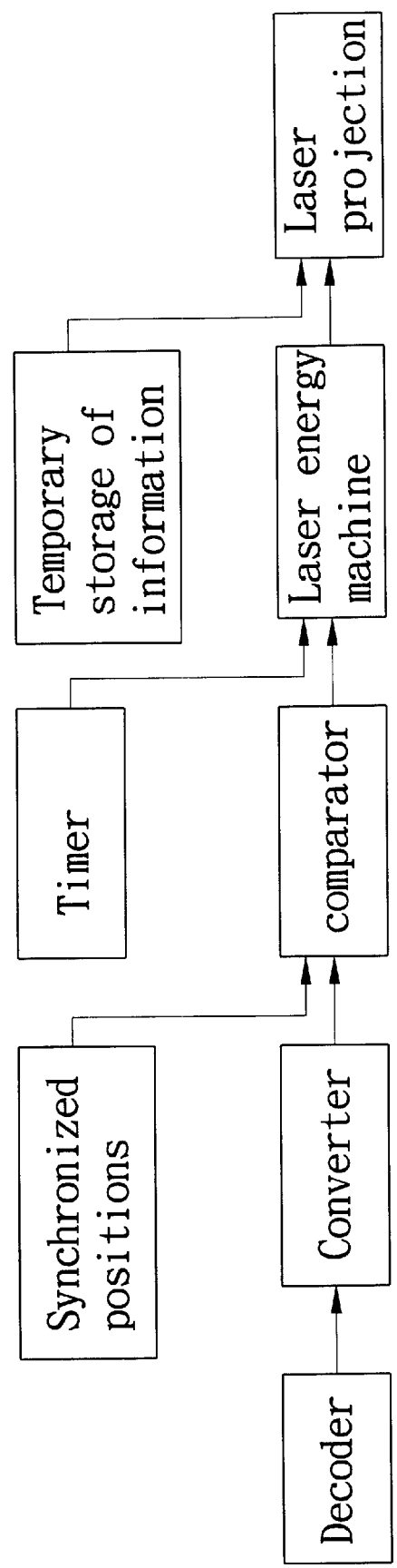
FIG. 6 shows a block diagram showing the operation of a preferred embodiment of the present invention.

Referring again to FIGS. 4 and 6 showing a schematic view and a block diagram explaining the operation of the preferred embodiment of the present invention, wherein in the first place, the speed of a motor can be measured through moving of a decoder to know the present position of the optical laser lens-seat 12, and through a converting module, by changing the magnitude of the speed of the decoder, and through a comparator, with different speeds and different powers, the information of a timer and the comparator enter together into a laser energy machine; by timing of the timer and different transient speeds and different laser powers, the laser power projected from the optical laser lens-seat 12 can be different.

The method for controlling a seat of an optical lens on a laser processing machine of the present invention includes the following advantages:

1. The optical laser lens-seat divides the carving working zone into a starting zone, a middle zone and an end zone. The optical laser lens-seat is accelerated in the starting zone, has a constant speed in the middle zone 14, and is decelerated in the end zone. Thereby, the amount of laser irradiation in each displacement unit can be equal, both sides of the working piece do not need to leave inactive sides to do virtual works, hence the speed of working can be increased and the time of working can be reduced.

2. the optical laser lens-seat divides the input pattern into three parts when it is moved over the working piece, the area where the optical laser lens-seat stays is a starting zone (the starting zone and the end zone can be changed over with each other), so that when the optical laser lens-seat completes the movement from the left to the right (or from the right to the left), it needs not to move back to the left for restarting.

3. In using the method of the present invention, when the laser processing machine works on a small working piece, the large sides resulting virtual works on both sides of the working zone of the laser processing machine can be eliminated, so that the processing speed on the small working piece can be increased.

In conclusion, the method for controlling a seat of an optical lens on a laser processing machine of the present invention can reduce the time of working of the laser processing machine, it is novel and competitive in markets, thereby has industrial value.

Having thus described my invention, what I claim as new and desire to be secured by Letters Patent of the United States are:

1. A method for controlling a seat of an optical lens on a laser processing machine, said method comprises the following steps:
   a. said optical laser lens-seat divides a working zone into three parts when it is moved over a working piece;
   b. said optical laser lens-seat is accelerated when it stays at the first part, is in a constant speed when it stays at the second part, and is decelerated when it stays at the third part;
   c. said optical laser lens-seat keeps its normal output power when it is at said part with said constant-speed, its output power is relatively increased when it is at said part being accelerated, and its output power is relatively reduced when it is at said part being decelerated;
   d. the amount of laser irradiation in each displacement unit thus is equal, hence working time is reduced.

2. The method for controlling a seat of an optical lens on a laser processing machine as in claim 1, wherein, when the area of said working piece is small, said optical laser lens-seat divides said working zone into three parts too; said second part is changed as a starting line in a virtual way for decelerating.

* * * * *